United States Patent
Kitaura et al.

(10) Patent No.: US 12,442,535 B2
(45) Date of Patent: Oct. 14, 2025

(54) HEATING COOKING APPARATUS

(71) Applicant: SHARP KABUSHIKI KAISHA, Sakai (JP)

(72) Inventors: Tomohiro Kitaura, Sakai (JP); Shinji Asami, Sakai (JP); Masahiro Nishijima, Sakai (JP); Hiromi Suenaga, Sakai (JP); Masayuki Iwamoto, Sakai (JP); Yu Shinohara, Sakai (JP); Tsuyoshi Ootani, Sakai (JP); Kiyonori Nakamura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 743 days.

(21) Appl. No.: 17/797,237

(22) PCT Filed: Feb. 2, 2021

(86) PCT No.: PCT/JP2021/003689
§ 371 (c)(1),
(2) Date: Aug. 3, 2022

(87) PCT Pub. No.: WO2021/157559
PCT Pub. Date: Aug. 12, 2021

(65) Prior Publication Data
US 2023/0057676 A1    Feb. 23, 2023

(30) Foreign Application Priority Data
Feb. 7, 2020    (JP) .................. 2020-019681

(51) Int. Cl.
*A47J 36/02* (2006.01)
*F24C 7/02* (2006.01)
*H05B 6/78* (2006.01)

(52) U.S. Cl.
CPC .............. *F24C 7/02* (2013.01); *A47J 36/02* (2013.01); *H05B 6/78* (2013.01)

(58) Field of Classification Search
CPC ........ F24C 7/02; H05B 6/6414; H05B 6/6485
(Continued)

(56) References Cited

U.S. PATENT DOCUMENTS 4,814,571 A * 3/1989 Bowen .................. H05B 6/766
219/757
5,345,068 A * 9/1994 Hatano .................... F24C 7/08
219/754

(Continued)

FOREIGN PATENT DOCUMENTS

| JP | 2010-133634 A | 6/2010 |
| WO | 2022/153942 A1 | 7/2022 |

*Primary Examiner* — Quang T Van
(74) *Attorney, Agent, or Firm* — ScienBiziP, P.C.

(57) ABSTRACT

A heating cooking apparatus includes a microwave supply unit (15), and a drawer portion (2). The microwave supply unit (15) is positioned below a heating cooking chamber (100A) and configured to supply microwaves (M) to the heating cooking chamber (100A). The drawer portion (2) is configured to be pulled out with respect to the heating cooking chamber (100A). The drawer portion (2) includes a placing portion (22) made of non-metal and a wall portion (20) made of metal. The placing portion (20) includes a placing surface (22A) on which an object to be heated is placed. The wall portion (20) extends in a first direction (D1) intersecting the placing surface (22A).

7 Claims, 11 Drawing Sheets

(58) Field of Classification Search
USPC ....... 219/756, 722, 736, 737, 738, 739, 752, 219/753, 754, 763; 126/21 R, 198, 200
See application file for complete search history.

(56) References Cited

U.S. PATENT DOCUMENTS

| | | |
|---|---|---|
| 8,253,084 B2 | 8/2012 | Toyoda et al. |
| 2010/0133263 A1 | 6/2010 | Toyoda et al. |
| 2012/0187115 A1 | 7/2012 | Toyoda et al. |
| 2012/0192725 A1 | 8/2012 | Toyoda et al. |

* cited by examiner

HEATING COOKING APPARATUS

TECHNICAL FIELD

The present invention relates to a heating cooking apparatus.

BACKGROUND ART

PTL 1 discloses a pull-out heating cooking apparatus. The pull-out heating cooking apparatus disclosed in PTL 1 includes a heating cooking apparatus main body and a pull-out body. The heating cooking apparatus main body includes a heating cooking chamber. The pull-out body can be pulled out toward the outside of the heating cooking apparatus main body in a state where the pull-out body is accommodated in the heating cooking chamber.

Heating functions of the pull-out heating cooking apparatus disclosed in PTL 1 include a microwave heating function and a rapid hot air heating function. The microwave heating function is a function of irradiating an object to be heated with microwaves. A radiation port for microwaves is formed in a side wall of the heating cooking chamber.

CITATION LIST

Patent Literature

PTL 1: JP 2010-133634 A

SUMMARY OF INVENTION

Technical Problem

Further, in recent years, uniformly irradiating a predetermined region with microwaves is awaited. In particular, in a case where an object to be heated is a plurality of grains, irradiating each of the plurality of grains with microwaves is awaited.

In light of the above problem, the present invention is directed to providing a heating cooking apparatus that can uniformly and efficiently irradiate a predetermined region with microwaves.

Solution to Problem

A heating cooking apparatus according to an aspect of the present invention includes a microwave supply unit and a drawer portion. The microwave supply unit is positioned below a heating cooking chamber and configured to supply microwaves to the heating cooking chamber. The drawer portion is configured to be pulled out with respect to the heating cooking chamber. The drawer portion includes a placing portion made of non-metal and a wall portion made of metal. The placing portion includes a placing surface on which an object to be heated is placed. The wall portion extends in a first direction intersecting the placing surface.

Advantageous Effects of Invention

According to the heating cooking apparatus of the present invention, it is possible to uniformly and efficiently irradiate a predetermined region with microwaves.

DESCRIPTION OF EMBODIMENTS

Figure 1:
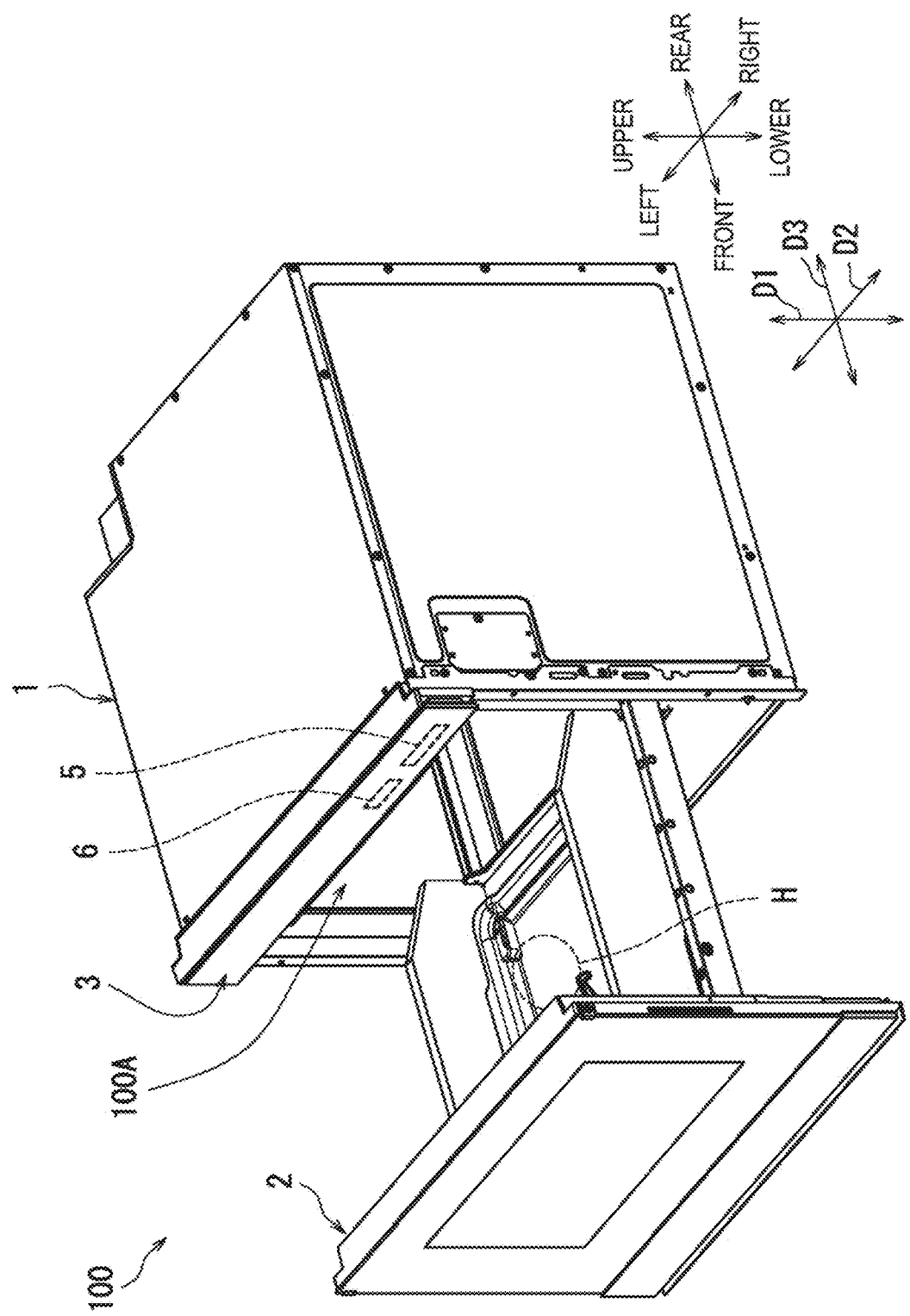
FIG. 1 is a perspective view illustrating a pull-out heating cooking apparatus according to an embodiment of the present invention.

Hereinafter, an embodiment of a pull-out heating cooking apparatus according to the present invention will be described with reference to the drawings. Note that, in the drawings, the same or equivalent components are denoted by the same reference numerals and signs, and description thereof will not be repeated.

Figure 2:
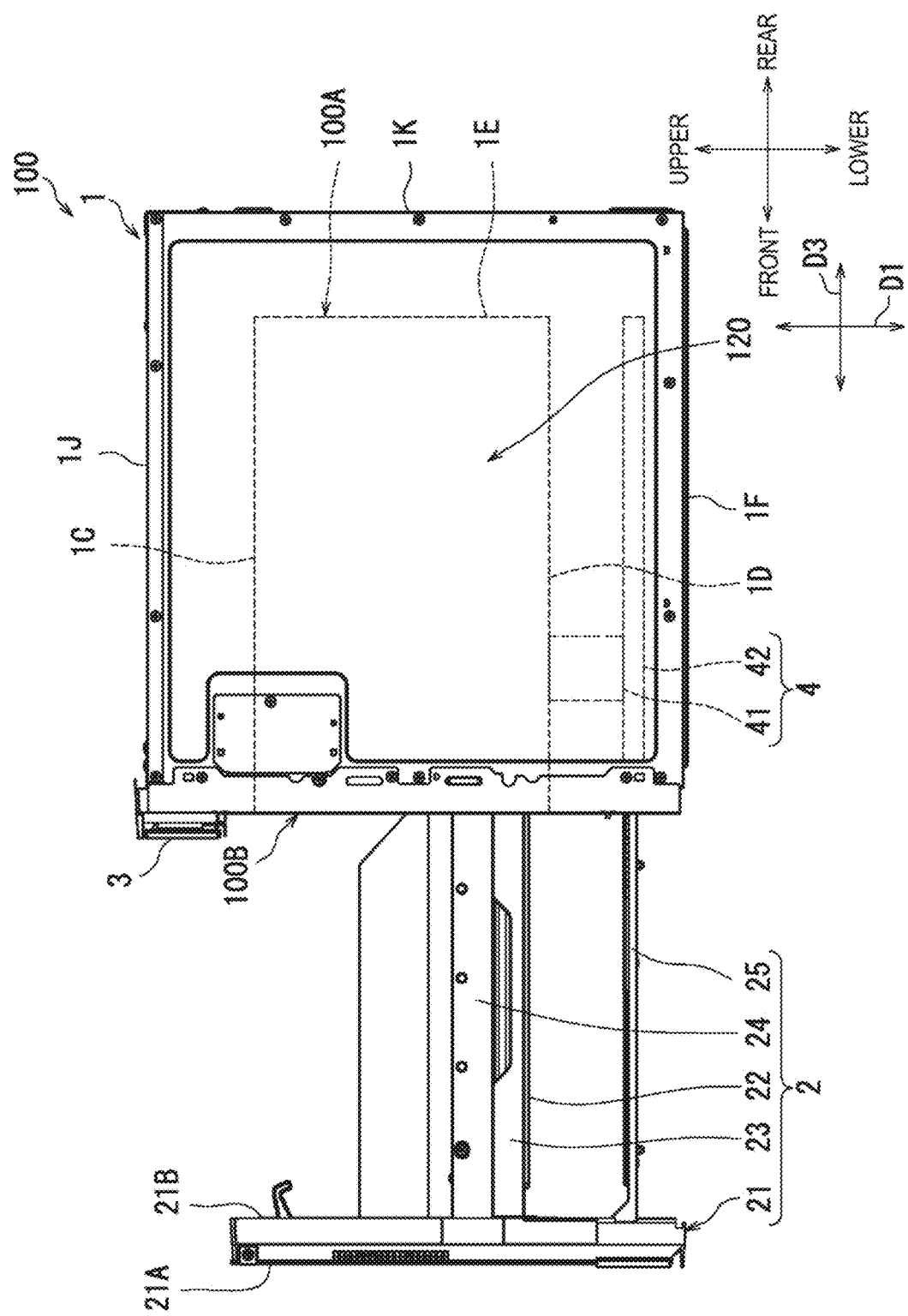
FIG. 2 is a right side surface view illustrating the pull-out heating cooking apparatus according to an embodiment.
Figure 3:
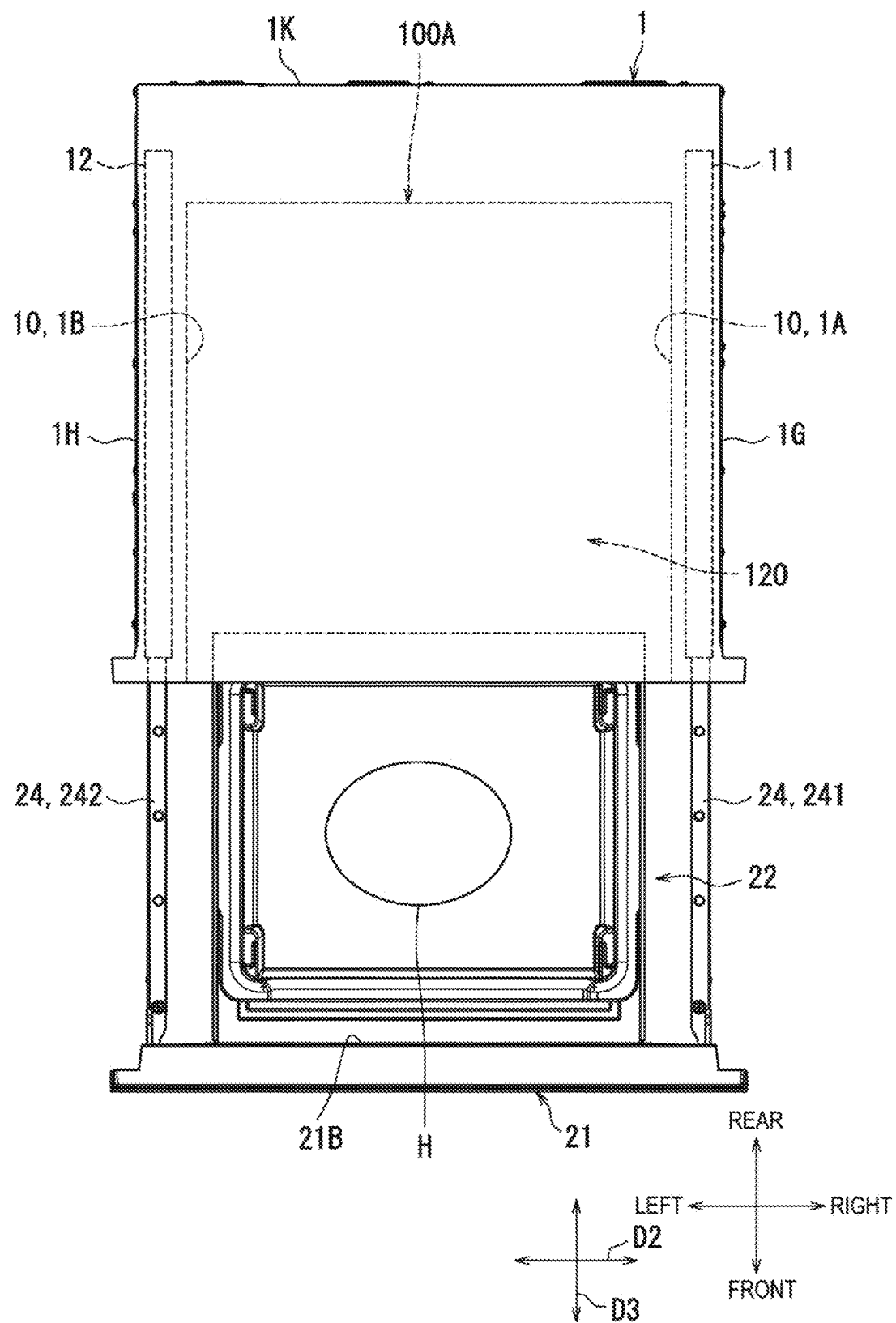
FIG. 3 is a top view illustrating the pull-out heating cooking apparatus according to an embodiment.

A pull-out heating cooking apparatus 100 according to an embodiment will be described with reference to FIG. 1 to FIG. 3. FIG. 1 is a perspective view illustrating the pull-out heating cooking apparatus 100. FIG. 2 is a right side surface view illustrating the pull-out heating cooking apparatus 100. FIG. 3 is a top view illustrating the pull-out heating cooking apparatus 100. More specifically, FIG. 1 to FIG. 3 illustrate the pull-out heating cooking apparatus 100 in a state where a pull-out body 2 is pulled out. Further, FIG. 1 illustrates the appearance of the pull-out heating cooking apparatus 100 when viewed from above obliquely from the right. The pull-out heating cooking apparatus 100 is one example of a heating cooking apparatus.

As illustrated in FIG. 1, the pull-out heating cooking apparatus 100 heats and cooks an object H to be heated. The object H to be heated is, for example, a food product. The pull-out heating cooking apparatus 100 includes a heating chamber 1, the pull-out body 2, an operation panel 3, a control unit 5, and a storage unit 6. The pull-out body 2 is an example of a drawer portion.

In an embodiment, a side at which the operation panel 3 of the pull-out heating cooking apparatus 100 is disposed is defined as a front side of the pull-out heating cooking apparatus 100, and a side opposite to the front side (rear face side) is defined as a rear side of the pull-out heating cooking apparatus 100. Further, a right side when the pull-out heating cooking apparatus 100 is viewed from the front side is defined as a right side of the pull-out heating cooking apparatus 100, and a side opposite to the right side is defined as a left side of the pull-out heating cooking apparatus 100. Further, in a direction orthogonal to a front-rear direction and a left-right direction of the pull-out heating cooking apparatus 100, a side at which the operation panel 3 is disposed is defined as an upper side of the pull-out heating cooking apparatus 100, and a side opposite to the upper side (bottom side) is defined as a lower side of the pull-out heating cooking apparatus 100. Note that these orientations do not limit an orientation of the pull-out heating cooking apparatus 100 according to the present invention in use. In an embodiment, a first direction D1 is along an up-down direction.

As illustrated in FIG. 1 to FIG. 3, the heating chamber 1 is a box-like member. Specifically, the heating chamber 1 includes a right outer wall 1G, a left outer wall 1H, a top outer wall 1J, a bottom outer wall 1F, and a back outer wall 1K. The heating chamber 1 also includes a heating cooking chamber 100A. The heating cooking chamber 100A is positioned inside the heating chamber 1.

The pull-out body 2 can be pulled out from the heating cooking chamber 100A. Specifically, the pull-out body 2 can be pulled out from the heating cooking chamber 100A along a third direction D3. The third direction D3 intersects the first direction D1. In a first embodiment, the third direction D3 is orthogonal to the first direction D1. The third direction D3 is along the front-rear direction. Further, in an embodiment, the third direction D3 is orthogonal to the first direction D1 and a second direction D2. The heating cooking chamber 100A includes a placing space (predetermined region) 120 in which the object H to be heated is placed. The shape of the heating cooking chamber 100A is, for example, a substantially rectangular parallelepiped shape. The front side of the heating cooking chamber 100A is opened for allowing the object H to be heated to be inserted and removed. Specifically, the heating cooking chamber 100A includes a pair of side wall portions 10, a back wall 1E, and an opening portion 100B. The back wall 1E is an example of a rear face wall portion. The pair of side wall portions 10 face each other in the second direction D2. Specifically, the pair of side wall portions 10 includes a right wall 1A and a left wall 1B. The back wall 1E intersects the third direction D3. The opening portion 100B faces the back wall 1E. The opening portion 100B communicates with the outside of the heating cooking chamber 100A. The heating cooking chamber 100A further includes a top wall 1C and a bottom wall 1D. Materials of the right wall 1A, the left wall 1B, the top wall 1C, the bottom wall 1D, and the back wall 1E are, for example, a metal.

The heating chamber 1 further includes a space between the bottom wall 1D and the bottom outer wall 1F. The heating chamber 1 further includes a space between the right wall 1A and the right outer wall 1G. The heating chamber 1 further includes a space between the left wall 1B and the left outer wall 1H. The heating chamber 1 further includes a space between the top wall 1C and the top outer wall 1J. The heating chamber 1 further includes a space between the back wall 1E and the back outer wall 1K.

The operation panel 3 includes an operation unit and a display unit. The operation unit receives an operation from a user. The operation unit includes various types of keys. The display unit displays various pieces of information. The display unit includes a liquid crystal panel. The operation panel 3 is located on an upper portion of a front face of the heating chamber 1.

As illustrated in FIG. 1 again, the storage unit 6 includes a Random Access Memory (RAM) and a Read Only Memory (ROM). The storage unit 6 stores a control program used for controlling an operation of each unit of the pull-out heating cooking apparatus 100. The storage unit 6 stores setting information input when the operation panel 3 is operated.

The control unit 5 is a hardware circuit that includes a processor such as a Central Processing Unit (CPU). The control unit 5 executes a control program stored in the storage unit 6.

Figure 4:
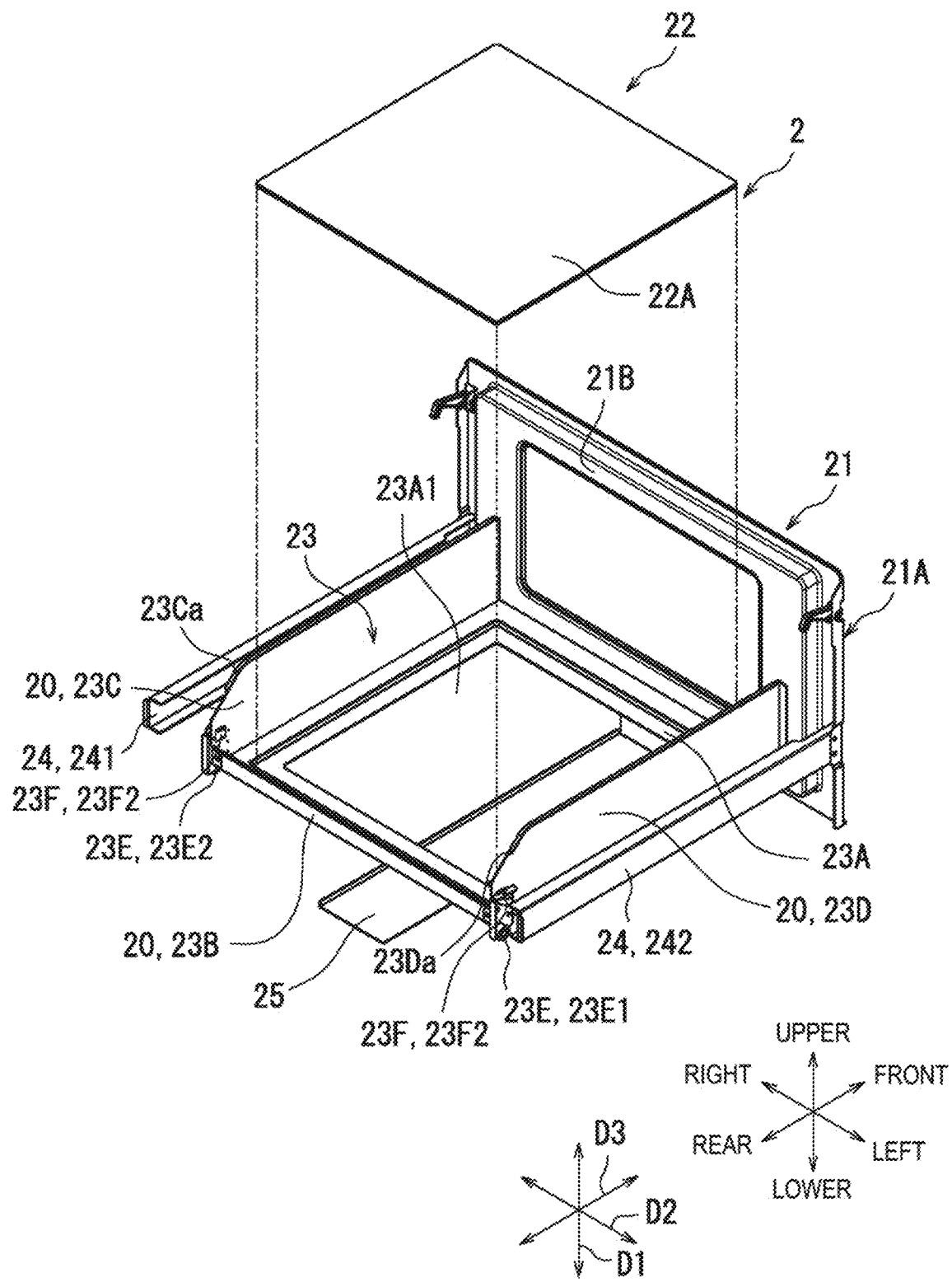
FIG. 4 is an exploded perspective view illustrating a pull-out body according to an embodiment.

Next, the pull-out body 2 according to an embodiment will be described with reference to FIG. 1 to FIG. 4. FIG. 4 is an exploded perspective view illustrating the pull-out body 2. As illustrated in FIG. 1 to FIG. 4, the pull-out body 2 can be pulled out from and retracted into the heating chamber 1. Specifically, as illustrated in FIG. 4, the pull-out body 2 includes a lid portion 21, a placing portion 22, and a support portion 23.

As illustrated in FIG. 1 to FIG. 3, the lid portion 21 can open and close the opening portion 100B on the front side of the heating cooking chamber 100A. The lid portion 21 is a plate-like member having a substantially rectangular shape. The lid portion 21 includes a front face 21A and a rear surface 21B. The lid portion 21 opens the opening portion 100B on the front side of the heating cooking chamber 100A in a state where the pull-out body 2 is pulled out from the heating cooking chamber 100A. The lid portion 21 can close the opening portion 100B on the front side of the heating cooking chamber 100A in a state where the pull-out body 2 is retracted into the heating cooking chamber 100A. Note that a distance between the right wall 1A and the left wall 1B is greater than a distance between the lid portion 21 that closes the opening portion 100B and the back wall 1E. Further, a distance between the lid portion 21 that closes the opening portion 100B and the back wall 1E is greater than a distance between the top wall 1C and the bottom wall 1D.

As illustrated in FIG. 4, the object H to be heated can be placed on the placing portion 22. Specifically, the placing portion 22 has a placing surface 22A on which the object H to be heated is placed. The material of the placing portion 22 is made of non-metal and is preferably made of ceramic or glass, for example. As a result, the placing portion 22 transmits microwaves.

The support portion 23 is fixed to the rear surface 21B of the lid portion 21 and supports a peripheral portion of the placing portion 22 such that the placing portion 22 is held in a horizontal state. Specifically, the support portion 23 includes a bottom plate portion 23A, at least one wall portion 20, and a pair of rollers 23E. A material of the support portion 23 is, for example, a metal.

The bottom plate portion 23A includes a rectangular opening portion 23A1. The rectangular opening portion 23A1 is positioned at a substantially center portion of the bottom plate portion 23A.

The at least one wall portion 20 extends in the first direction D1 intersecting the placing surface 22A. The at least one wall portion 20 includes a pair of wall portions 20 facing each other in the second direction D2. Each of the pair of wall portions 20 extends along the third direction D3. Specifically, the pair of wall portions 20 includes a right side plate portion 23C and a left side plate portion 23D. More specifically, heights of the right side plate portion 23C and the left side plate portion 23D from the placing surface 22A are each preferably 10% or more of a height of the side wall portion 10 from the placing surface 22A, and more preferably 50% or more thereof. In addition, a plurality of wall portions 20 further includes a back plate portion 23B. A height of the back plate portion 23B is lower than each of the heights of the right side plate portion 23C and the left side plate portion 23D.

More specifically, the back plate portion 23B, the right side plate portion 23C, and the left side plate portion 23D are erected upward from the peripheral portion of the bottom plate portion 23A. Further, the right side plate portion 23C includes a notch portion 23Ca on the back plate portion 23B side. The left side plate portion 23D includes a notch portion 23Da on the back plate portion 23B side. As a result, each of the heights of the right side plate portion 23C and the left side plate portion 23D is lower toward the back plate portion 23B side. The placing portion 22 is fitted among the lid portion 21, the back plate portion 23B, the right side plate portion 23C, and the left side plate portion 23D. The peripheral portion of the placing portion 22 is fixed to an upper surface of the peripheral portion of the bottom plate portion 23A.

The support portion 23 further includes the pair of rollers 23E and a pair of rollers 23F. The pair of rollers 23E and the pair of rollers 23F rotate as the pull-out body 2 moves. Specifically, one roller of the pair of rollers 23E includes a right roller 23E1, and the other roller of the pair of rollers 23E includes a left roller 23E2. The right roller 23E1 and the left roller 23E2 rotate about a rotation axis along the second direction D2. In addition, the right roller 23E1 is attached to a rear end portion of the right side plate portion 23C. The left roller 23E2 is attached to a rear end portion of the left side plate portion 23D. The right roller 23E1 and the left roller 23E2 are in contact with the bottom wall 1D. Also, one roller of the pair of rollers 23F includes a right roller 23F1, and the other roller of the pair of rollers 23F includes a left roller 23F2. The right roller 23F1 and the left roller 23F2 rotate about a rotation axis along the first direction D1. In addition, the right roller 23F1 is attached to a rear end portion of the right side plate portion 23C. The left roller 23F2 is attached to a rear end portion of the left side plate portion 23D. The right roller 23F1 is in contact with the right wall 1A. The left roller 23F2 is in contact with the left wall 1B. As a result, in a case where the pull-out body 2 is pulled out or retracted, it is possible to prevent the back plate portion 23B from being laterally contorted in the heating cooking chamber 100A.

Then, the placing portion 22 and the support portion 23 are pulled out from the inside of the heating cooking chamber 100A to the outside by the pull-out body 2 being pulled out. The placing portion 22 and the support portion 23 are accommodated in the heating cooking chamber 100A in a state where the pull-out body 2 is retracted. That is, the support portion 23 moves between an accommodation position in the heating cooking chamber 100A and a drawn-out position outside the heating cooking chamber 100A.

The pull-out body 2 further includes a pair of slide members 24 and a support member 25. The pair of slide members 24 extend in the front-rear direction and determine the movement direction of the pull-out body 2. The pair of slide members 24 are fixed to the rear surface 21B of the lid portion 21. Specifically, one slide member of the pair of slide members 24 includes a right slide member 241 and the other slide member of the pair of slide members 24 includes a left slide member 242. Each of the right slide member 241 and the left slide member 242 is, for example, a member having the front-rear direction as a longitudinal direction. The right slide member 241 and the left slide member 242 oppose each other in the left-right direction. One end portion of the right slide member 241 is attached to a right edge portion of the rear surface 21B of the lid portion 21. One end portion of the left slide member 242 is attached to a left edge portion of the rear surface 21B of the lid portion 21.

On the other hand, as illustrated in FIG. 1 to FIG. 3, the heating chamber 1 further includes a right slide rail 11 and a left slide rail 12. The right slide rail 11 is fixed in a space between the right wall 1A and the right outer wall 1G. The left slide rail 12 is fixed in a space between the left wall 1B and the left outer wall 1H. Each of the right slide rail 11 and the left slide rail 12 is a member having the front-rear direction as a longitudinal direction. The right slide member 241 is supported to be slidable along the right slide rail 11. The left slide member 242 is supported to be slidable along the left slide rail 12.

As illustrated in FIG. 4, the support member 25 supports the lid portion 21. More specifically, the support member 25 extends in the third direction D3 and determines the movement direction of the pull-out body 2. One end portion of the support member 25 is attached at a center portion in the left-right direction of the rear surface 21B of the lid portion 21 and below the placing portion 22. The support member 25 is, for example, a plate-like member having the front-rear direction as a longitudinal direction. The support member 25 includes a rack portion. The rack portion includes a plurality of teeth. The support member 25 may be a single plate-like member or a plurality of plate-like members.

Meanwhile, as illustrated in FIG. 2, the heating chamber 1 further includes a drive mechanism 4. The drive mechanism 4 drives the support member 25. The drive mechanism 4 is positioned below the heating cooking chamber 100A. Specifically, the drive mechanism 4 is accommodated in a space between the bottom wall 1D and the bottom outer wall 1F. For example, the drive mechanism 4 includes a drive motor 41, a pinion, and a drive rail 42. The drive rail 42 is fixed in a space between the bottom wall 1D and the bottom outer wall 1F. The drive rail 42 is a member having the front-rear direction as a longitudinal direction. The support member 25 is supported to be slidable along the drive rail 42. The pinion is attached to a tip end portion of the drive motor 41. The pinion engages with the rack portion of the support member 25. Furthermore, the support member 25 moves in the front-rear direction when the pinion rotates. As a result, the pull-out body 2 moves between the accommodation position and the drawn-out position. Note that the drive mechanism 4 may drive at least one of the support member 25, the right slide member 241, and the left slide member 242. Further, in a case where the right slide member 241 and the left slide member 242 are driven, the drive mechanism 4 may be positioned on the side of the heating cooking chamber 100A.

Figure 5:
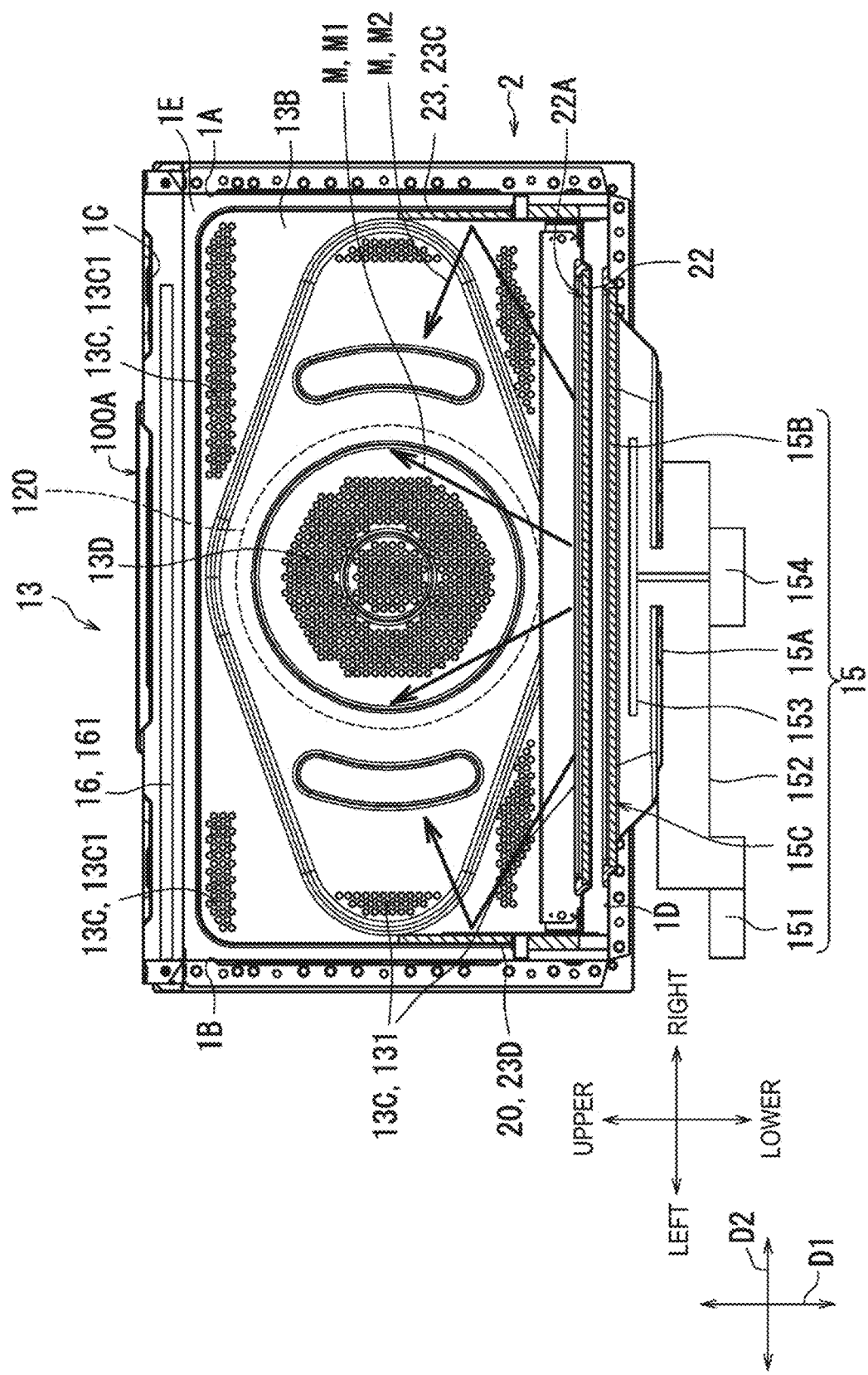
FIG. 5 is a diagram illustrating a cross section of a heating chamber taken along a plane orthogonal to a third direction in the pull-out heating cooking apparatus according to an embodiment.
Figure 6:
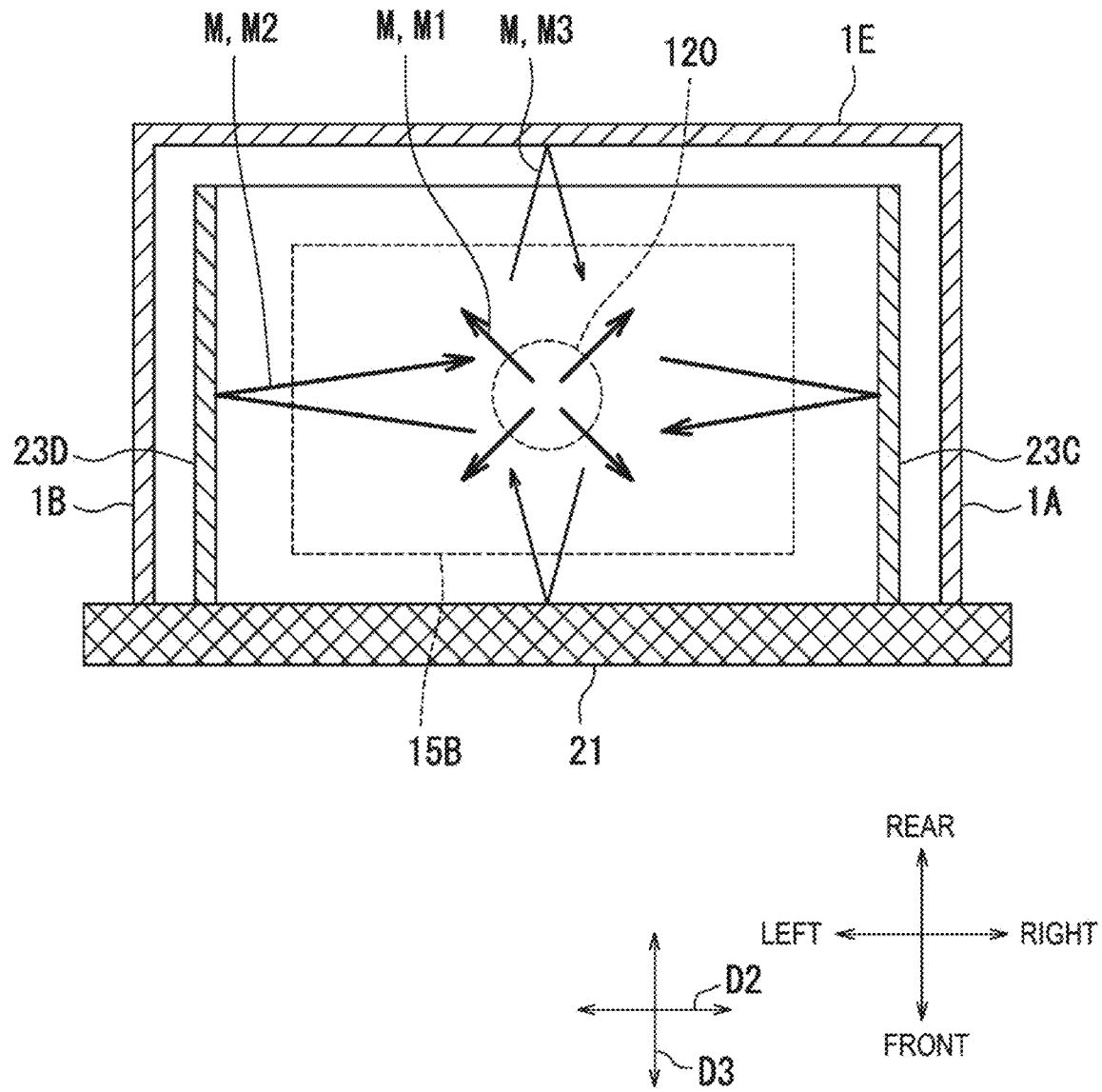
FIG. 6 is a diagram illustrating a cross section of the heating chamber taken along a plane orthogonal to a first direction in the pull-out heating cooking apparatus according to an embodiment.

Next, the heating chamber 1 will be further described with reference to FIG. 5 and FIG. 6. FIG. 5 and FIG. 6 are diagrams each illustrating a schematic cross section of the heating chamber 1. More specifically, FIG. 5 is a diagram illustrating a cross section of the heating chamber 1 taken along a plane orthogonal to the third direction D3. FIG. 6 is a diagram illustrating a cross section of the heating chamber 1 taken along a plane orthogonal to the first direction D1.

As illustrated in FIG. 5 and FIG. 6, the microwave supply unit 15 supplies microwaves M into the heating cooking chamber 100A. Specifically, the pull-out heating cooking apparatus 100 further includes the microwave supply unit 15.

The microwave supply unit 15 is positioned below the heating cooking chamber 100A. Specifically, the microwave supply unit 15 is positioned outside the heating cooking chamber 100A via the bottom wall 1D. The microwave supply unit 15 includes a partition member 15B, a radiation chamber 15A, a radiation port 15C, a magnetron 151, a waveguide 152, a rotary antenna 153, and an antenna motor 154. The partition member 15B is an example of a cover member. The magnetron 151 generates the microwaves M. The waveguide 152 propagates the microwaves M generated by the magnetron 151 to the radiation chamber 15A.

The shape of the radiation port 15C is, for example, a rectangular shape. In addition, the radiation port 15C is positioned above the radiation chamber 15A and below the heating cooking chamber 100A. Specifically, the radiation port 15C is positioned at a substantially center portion of the bottom wall 1D. The rotary antenna 153 is accommodated in the radiation chamber 15A. The antenna motor 154 drives the rotary antenna 153. The rotary antenna 153 agitates the microwaves M and supplies the microwaves M to the heating cooking chamber 100A through the radiation port 15C.

The partition member 15B covers the radiation port 15C. The partition member 15B need only have a shape that can cover the radiation port 15C. The partition member 15B is preferably a plate-like member. Further, the shape of the partition member 15B is, for example, a rectangular shape when viewed from the vertical direction.

The material of the partition member 15B is a non-metal and includes a ceramic or glass, for example. As a result, the material of the partition member 15B includes a ceramic or glass, and thus the partition member 15B transmits the microwaves M. On the other hand, a material of each of the radiation chamber 15A and the waveguide 152 includes a metal.

Further, in a state where the pull-out body 2 is retracted into the heating cooking chamber 100A, the placing portion 22 is positioned above the partition member 15B. In addition, in a state where the pull-out body 2 is retracted into the heating cooking chamber 100A, the wall portion 20 is disposed at a position closer to the radiation port 15C than the side wall portion 10. Specifically, in a state where the pull-out body 2 is retracted into the heating cooking chamber 100A, the right side plate portion 23C is disposed at a position closer to the radiation port 15C than the right wall 1A. In a state where the pull-out body 2 is retracted into the heating cooking chamber 100A, the left side plate portion 23D is disposed at a position closer to the radiation port 15C than the left wall 1B.

Here, an example of flows of the microwaves M will be described in detail. The microwave supply unit 15 supplies a plurality of microwaves M to the heating cooking chamber 100A. The microwaves M include a first microwave M1, a second microwave M2, and a third microwave M3. The first microwave M1 travels toward a placing space 120. Further, the second microwave M2 travels toward the right side plate portion 23C and the left side plate portion 23D. Each of the right side plate portion 23C and the left side plate portion 23D reflects the second microwave M2 toward the placing space 120. As a result, the second microwave M2 travels toward the placing space 120. Further, the third microwave M3 travels toward the back wall 1E and the lid portion 21. Each of the back wall 1E and the lid portion 21 reflects the second microwave M2 toward the placing space 120. As a result, the third microwave M3 travels toward the placing space 120. In this way, the placing space 120 is irradiated with the microwaves M from various directions.

As described above with reference to FIG. 1 to FIG. 6, according to an embodiment, the wall portion 20 made of metal extends in the first direction D1 intersecting the placing surface 22A. The wall portion 20 made of metal reflects the microwaves M towards the placing space 120. Accordingly, it is possible to uniformly and efficiently irradiate the placing space 120 with the microwaves M. Specifically, each of the right side plate portion 23C and the left side plate portion 23D reflects the second microwave M2 toward the placing space 120. Accordingly, it is possible to more uniformly and more efficiently irradiate the placing space 120 with the microwaves M. Further, the distance between the right wall 1A and the left wall 1B is greater than the distance between the lid portion 21 that closes the opening portion 100B and the back wall 1E. The right side plate portion 23C is disposed at a position closer to the radiation port 15C than the right wall 1A. The left side plate portion 23D is disposed at a position closer to the radiation port 15C than the left wall 1B. Accordingly, it is possible to more uniformly and more efficiently irradiate the placing space 120 with the microwaves M. As a result, even in a case where the object H to be heated is a plurality of grains, it is possible to irradiate each of the plurality of grains with the microwaves M.

Further, as illustrated in FIG. 5, the pull-out heating cooking apparatus 100 further includes a grill unit 16. Specifically, the grill unit 16 includes a heater 161 and an energization unit. The heater 161 is positioned in the heating cooking chamber 100A and heats the object H to be heated. Specifically, the heater 161 is positioned at an upper portion in the heating cooking chamber 100A. The heater 161 has substantially a U shape when viewed from the vertical direction. In an embodiment, three grill units 16 are disposed. The heater 161 is, for example, a sheathed heater. The energization unit is positioned outside the heating cooking chamber 100A. The energization unit energizes the heater 161. The heater 161 energized generates heat.

According to the pull-out heating cooking apparatus 100 of the present invention, the heater 161 is provided in an upper portion in the heating cooking chamber 100A, and the microwave supply unit 15 is provided below the heating cooking chamber 100A. Accordingly, conducting heat generated in the heater 161 to an upper surface of the object H to be heated allows for efficiently heating the upper surface of the object H to be heated.

Figure 7:
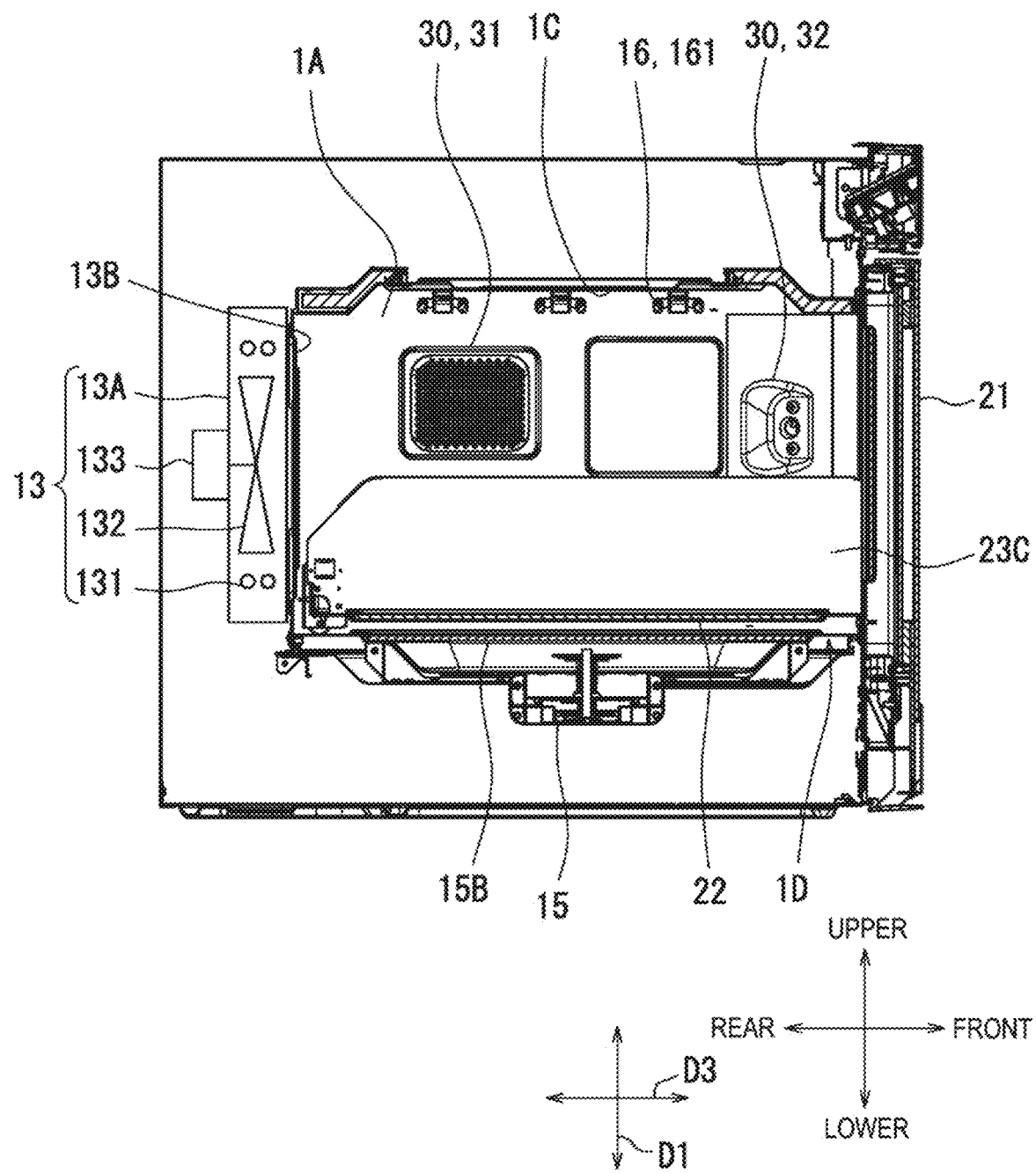
FIG. 7 is a diagram illustrating a cross section of the heating chamber taken along a plane orthogonal to a second direction in the pull-out heating cooking apparatus according to an embodiment.

Subsequently, an air sending unit 13 will be further described with reference to FIG. 7. FIG. 7 is a diagram illustrating a cross section of the heating chamber 1 taken along a plane orthogonal to the second direction D2. As illustrated in FIG. 7, the pull-out heating cooking apparatus 100 further includes the air sending unit 13 and at least one functional member 30.

The air sending unit 13 supplies hot air into the heating cooking chamber 100A. Specifically, the air sending unit 13 includes a suction hole portion 13D, a plurality of blow-out hole portions 13C, and a partition member 13B. The air sending unit 13 is positioned behind the heating cooking chamber 100A via the back wall 1E. The suction hole portion 13D is positioned behind the placing space 120. Each of the plurality of blow-out hole portions 13C is positioned behind the placing space 120.

The air sending unit 13 suctions hot air in the heating cooking chamber 100A through the suction hole portion 13D and blows out the hot air into the heating cooking chamber 100A through the plurality of blow-out hole portions 13C. More specifically, the air sending unit 13 suctions hot air from a center portion in the heating cooking chamber 100A and blows out the hot air to a peripheral portion in the heating cooking chamber 100A. As a result, the entire inside of the heating cooking chamber 100A can be heated by driving the air sending unit 13.

More specifically, the air sending unit 13 further includes an air sending chamber 13A, a heater 131, a centrifugal fan 132, and a drive unit 133. The air sending chamber 13A is, for example, a box-like member. The centrifugal fan 132 includes a plurality of blades.

The heater 131 and the centrifugal fan 132 are accommodated in the air sending chamber 13A. The heater 131 heats air inside the air sending chamber 13A to generate hot air. Specifically, a shape of the heater 131 is a circular ring when viewed from the front side to the rear side. In addition, the heater 131 is disposed along the outer circumference of the centrifugal fan 132.

The drive unit 133 is positioned outside the air sending chamber 13A. The drive unit 133 energizes the heater 131 and drives the centrifugal fan 132. The drive unit 133 includes, for example, a motor and an energization unit.

The partition member 13B is positioned behind the placing space 120. Specifically, the partition member 13B is positioned between the air sending chamber 13A and the heating cooking chamber 100A. The partition member 13B is, for example, a plate-like member made of metal. The shape of the partition member 13B is, for example, a rectangular shape when viewed from the front side to the rear side. The partition member 13B is disposed on substantially the entire surface of the back wall 1E. The suction hole portion 13D and the plurality of blow-out hole portions 13C are disposed in the partition member 13B. Thus, the suction hole portion 13D and the blow-out hole portions 13C can be easily disposed behind the placing space 120. The blow-out hole portions 13C is an example of an air sending hole.

More specifically, the suction hole portion 13D is, for example, a set of a plurality of punched holes. Similarly, the blow-out hole portions 13C are, for example, a set of a plurality of punched holes. The punched holes each have, for example, a circular shape. A diameter of each of the punched holes of the suction hole portion 13D and the blow-out hole portions 13C is, for example, 3.4 mm to prevent radio waves from leaking. Thus, each of the suction hole portion 13D and the blow-out hole portions 13C has a small size. As a result, it is possible to prevent a tool or the like from being caught in each of the suction hole portion 13D and the blow-out hole portions 13C when the heating cooking chamber 100A is cleaned.

More specifically, the blow-out hole portions 13C are disposed along the outer circumference of the partition member 13B. Specifically, the suction hole portion 13D is positioned at the center portion of the partition member 13B. Further, the blow-out hole portions 13C include peripheral blow-out holes 13C1.

The peripheral blow-out holes 13C1 are positioned at peripheral portions along the edge of the back wall 1E. The peripheral blow-out holes 13C1 are formed to make the temperature in the heating cooking chamber 100A uniform.

Here, a flow of hot air will be described in detail. First, the air sending unit 13 suctions hot air in the heating cooking chamber 100A into the air sending chamber 13A through the suction hole portion 13D by using the centrifugal fan 132. The hot air suctioned into the air sending chamber 13A is heated by the heater 131. The air sending unit 13 blows the hot air in the air sending chamber 13A into the heating cooking chamber 100A through the blow-out hole portions 13C by using the centrifugal fan 132. The hot air blown into the heating cooking chamber 100A from the peripheral blow-out holes 13C1 mainly moves forward along the right wall 1A and the left wall 1B. Thereafter, the hot air that has reached the rear surface 21B of the lid portion 21 reverses its movement direction and moves backward. Then, the hot air that has reached the object H to be heated moves backward along the object H to be heated. The hot air moving backward moves within the heating cooking chamber 100A. Thereafter, the hot air is suctioned into the air sending chamber 13A again from the suction hole portion 13D. In this manner, the air sending unit 13 circulates hot air between the inside of the air sending chamber 13A and the inside of the heating cooking chamber 100A.

As described above, according to the pull-out heating cooking apparatus 100, the blow-out hole portions 13C include the peripheral blow-out holes 13C1. Thus, the object H to be heated can be more uniformly heated. Further, each of the pair of wall portions 20 extends along the third direction D3. The height of the back plate portion 23B is lower than each of the heights of the right side plate portion 23C and the left side plate portion 23D. Thus, the wall portion 20 does not inhibit supplying hot air to the object H to be heated.

The at least one functional member 30 changes a state of the atmosphere in the heating cooking chamber 100A. The at least one functional member 30 includes a suction/exhaust port 31 and an illumination unit 32. The suction/exhaust port 31 suctions/discharges air in the heating cooking chamber 100A. The illumination unit 32 illuminates the inside of the heating cooking chamber 100A. The position of the upper end of the wall portion 20 is lower than the position of the lower end of the functional member 30. More specifically, the position of the upper end of each of the plurality of wall portions 20 is lower than the position of the lower end of each of the plurality of functional members 30.

As described above, the position of the upper end of the wall portion 20 is lower than the position of the lower end of the functional member 30. Thus, the wall portion 20 does not inhibit changing the state of the atmosphere in the heating cooking chamber 100A.

Figure 8:
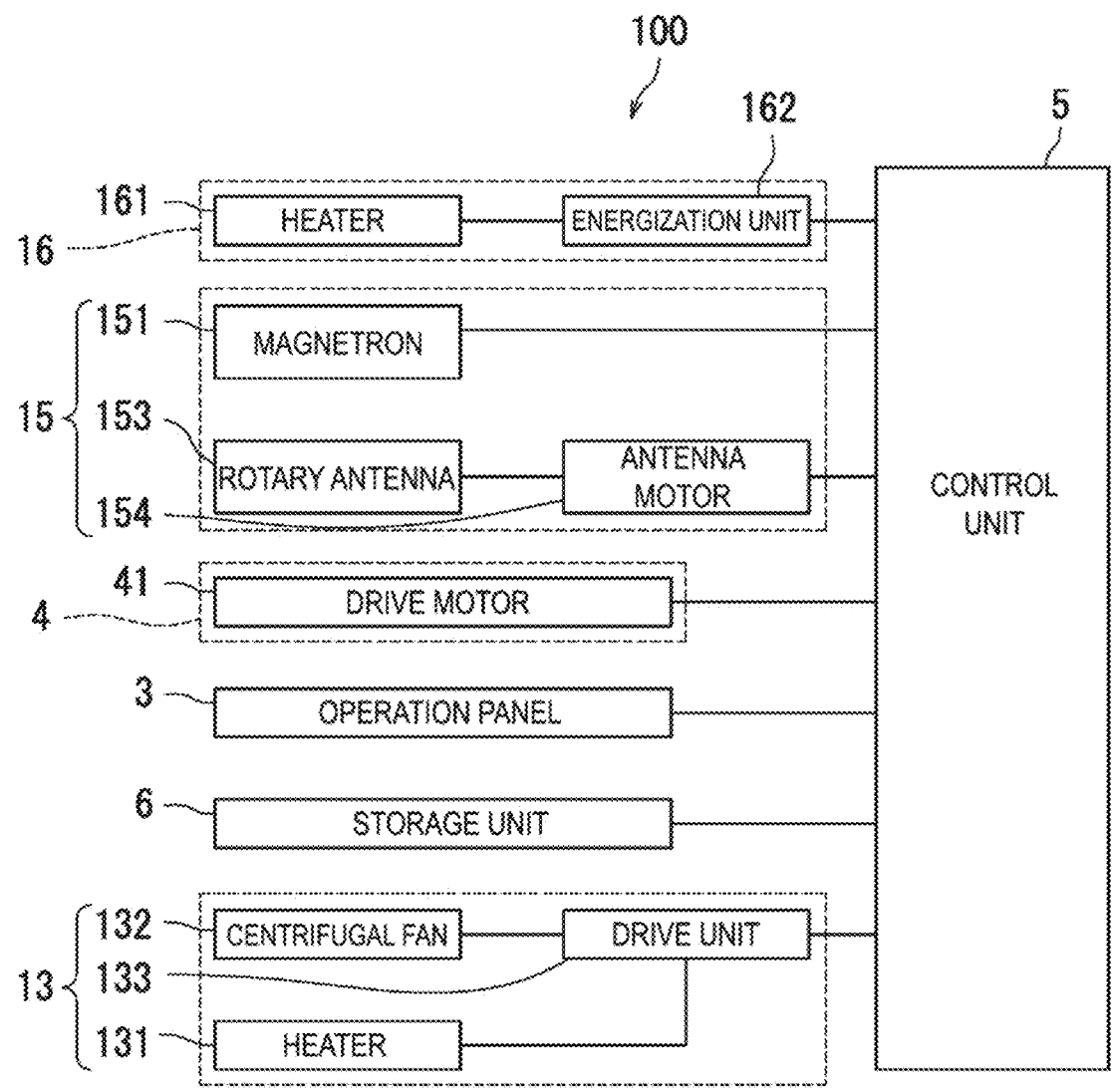
FIG. 8 is a block diagram illustrating a configuration of the pull-out heating cooking apparatus according to an embodiment.

A configuration of the pull-out heating cooking apparatus 100 will be described in detail with reference to FIG. 8. FIG. 8 is a block diagram illustrating the configuration of the pull-out heating cooking apparatus 100. In an embodiment, the pull-out heating cooking apparatus 100 has a "microwave heating mode," a "hot air circulation heating mode," and a "grill heating mode" as heating cooking modes. The "microwave heating mode" is mainly a mode in which the object H to be heated is heated and cooked through radiation of the microwaves M inside the heating cooking chamber 100A. The "grill heating mode" is mainly a mode in which the object H to be heated is heated and cooked by conducting heat generated by the heater 161 to the object H to be heated. The "hot air circulation heating mode" is mainly a mode in which the object H to be heated is heated and cooked by circulating hot air in the heating cooking chamber 100A to make the temperature in the heating cooking chamber 100A uniform.

The control unit 5 controls the magnetron 151, the antenna motor 154, the energization unit 162, the drive motor 41, the operation panel 3, the drive unit 133, and the storage unit 6 by executing control programs stored in the storage unit 6.

More specifically, the control unit 5 controls driving of the microwave supply unit 15, driving of the air sending unit 13, and driving of the grill unit 16. For example, in a case where the "microwave heating mode" is selected, the control unit 5 drives the magnetron 151 and the antenna motor 154. Further, in a case where the "grill heating mode" is selected, the control unit 5 energizes the energization unit 162. Further, in a case where the "hot air circulation heating mode" is selected, the control unit 5 drives the drive unit 133. The drive unit 133 energizes the heater 131 and drives the centrifugal fan 132.

Figure 9:
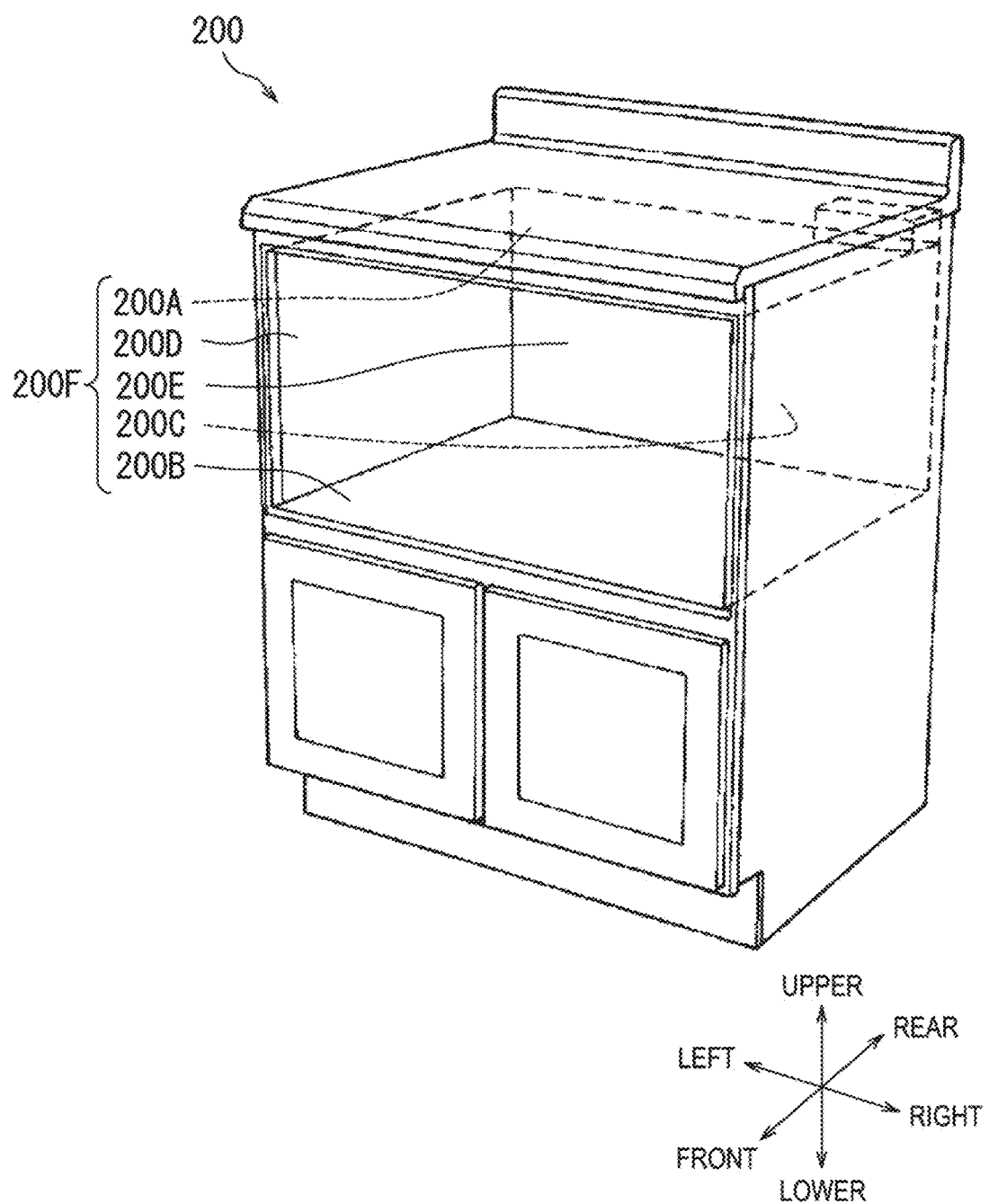
FIG. 9 is a perspective view illustrating a cabinet to which the pull-out heating cooking apparatus according to an embodiment is attached.

Subsequently, a cabinet 200 to which the pull-out heating cooking apparatus 100 is attached will be described with reference to FIG. 9. FIG. 9 is a perspective view illustrating the cabinet 200 to which the pull-out heating cooking apparatus 100 is attached.

As illustrated in FIG. 9, the pull-out heating cooking apparatus 100 is attached to the inside of the cabinet 200 to be installed. The cabinet 200 includes an upper wall 200A, a lower wall 200B, a right wall 200C, a left wall 200D, and a rear wall 200E. The upper wall 200A, the lower wall 200B, the right wall 200C, the left wall 200D, and the rear wall 200E form a container portion 200F. The container portion 200F is a rectangular parallelepiped space into which the pull-out heating cooking apparatus 100 is fitted.

An embodiment of the present invention has been described above with reference to the drawings. However, the present invention is not limited to the embodiment described above, and the present invention can be implemented in various modes without departing from the gist thereof. The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. Further, the material, shape, dimensions, and the like of each of the constituent elements illustrated in the embodiment described above are merely examples and are not particularly limited, and various modifications can be made within the scope not substantially departing from the effects of the present invention.

(1) As described with reference to FIG. 5 and FIG. 7, the pull-out heating cooking apparatus 100 includes the air sending unit 13, but the present invention is not limited thereto. For example, the pull-out heating cooking apparatus 100 may further include an air sending unit different from the air sending unit 13.

(2) As described with reference to FIG. 5 and FIG. 7, each of the blow-out hole portion 13C and the suction hole portion 13D is a set of a plurality of punched holes, but the present invention is not limited thereto. For example, each of the blow-out hole portion 13C and the suction hole portion 13D may be one opening portion, may be a plurality of slit holes, or may be a net-like portion.

EXAMPLES

Hereinafter, the present invention will be further specifically described using Examples. However, the present invention is not limited to the scope of Examples.

Example 1

In a pull-out heating cooking apparatus 100, a pull-out body 2 in which a support portion 23 included a bottom plate portion 23A and a pair of wall portions 20 was prepared. The pair of wall portions 20 include the right side plate portion 23C and the left side plate portion 23D. Each of the heights of the right side plate portion 23C and the left side plate portion 23D from the placing surface 22A is approximately 50% of the height of the side wall portion 10 from the placing surface 22A. Specifically, each of the heights of the right side plate portion 23C and the left side plate portion 23D from the placing surface 22A is 100 mm.

Example 2

A pull-out body 2 according to Example 2 having a configuration similar to that of the pull-out body 2 according to Example 1 except that the support portion 23 further included a back plate portion was prepared. A height of the back plate portion from the placing surface 22A is approximately 50% of the height of the side wall portion 10 from the placing surface 22A. Specifically, the height of the back plate portion from the placing surface 22A is 100 mm.

Example 3

A pull-out body 2 according to Example 3 having a configuration similar to that of the pull-out body 2 according to Example 1 except that each of the heights of the right side plate portion 23C and the left side plate portion 23D from the placing surface 22A is approximately 5% of the height of the side wall portion 10 from the placing surface 22A instead of approximately 50% of the height of the sidewall portion 10 from the placing surface 22A was prepared. Specifically, each of the heights of the right side plate portion 23C and the left side plate portion 23D from the placing surface 22A is 10 mm.

Comparative Example 1

A pull-out body 2 according to Comparative Example 1 having a configuration similar to that of the pull-out body 2 according to Example 1 except that the support portion 23 did not have the pair of wall portions 20 was prepared.
Evaluation 1
The pull-out bodies 2 according to Example 1 to Example 3 and Comparative Example 1 were used to heat and cook popcorn in the "microwave heating mode". Then, the number of finish cups of popcorn was measured. Note that popcorn having the number of 100% finish cups of 11.25 was used. The evaluation results are shown in Table

TABLE 1

| | Height of side plate portion (mm) | Height of back plate (mm) | Number of finish cups (CUP) | Finish rate (%) |
|---|---|---|---|---|
| Example 1 | 100 | 0 | 11.0 | 98 |
| Example 2 | 100 | 100 | 11.0 | 98 |
| Example 3 | 10 | 0 | 10.0 | 89 |
| Comparative Example 1 | 0 | 0 | 9.5 | 84 |

In a case where the pull-out bodies 2 according to Example 1 and Example 2 were used, the number of finish cups was 98%. In a case where the pull-out body 2 according to Example 3 was used, the number of finish cups was 89%. On the other hand, in a case where the pull-out body 2 according to Comparative Example 1 was used, the number of finish cups was 84%. That is, when the height of the side plate portion was 100 mm (approximately 50% of the height of the side wall portion from the placing surface 22A), the finish rate was favorable, and in a case where the pull-out body 2 having the height of the side plate portion of 100 mm (approximately 50% of the height of the side wall portion from the placing surface 22A) was used, it was possible to intensively irradiate the vicinity of the center of the placing surface 22A with the microwaves M.

Evaluation 2

Figure 10:
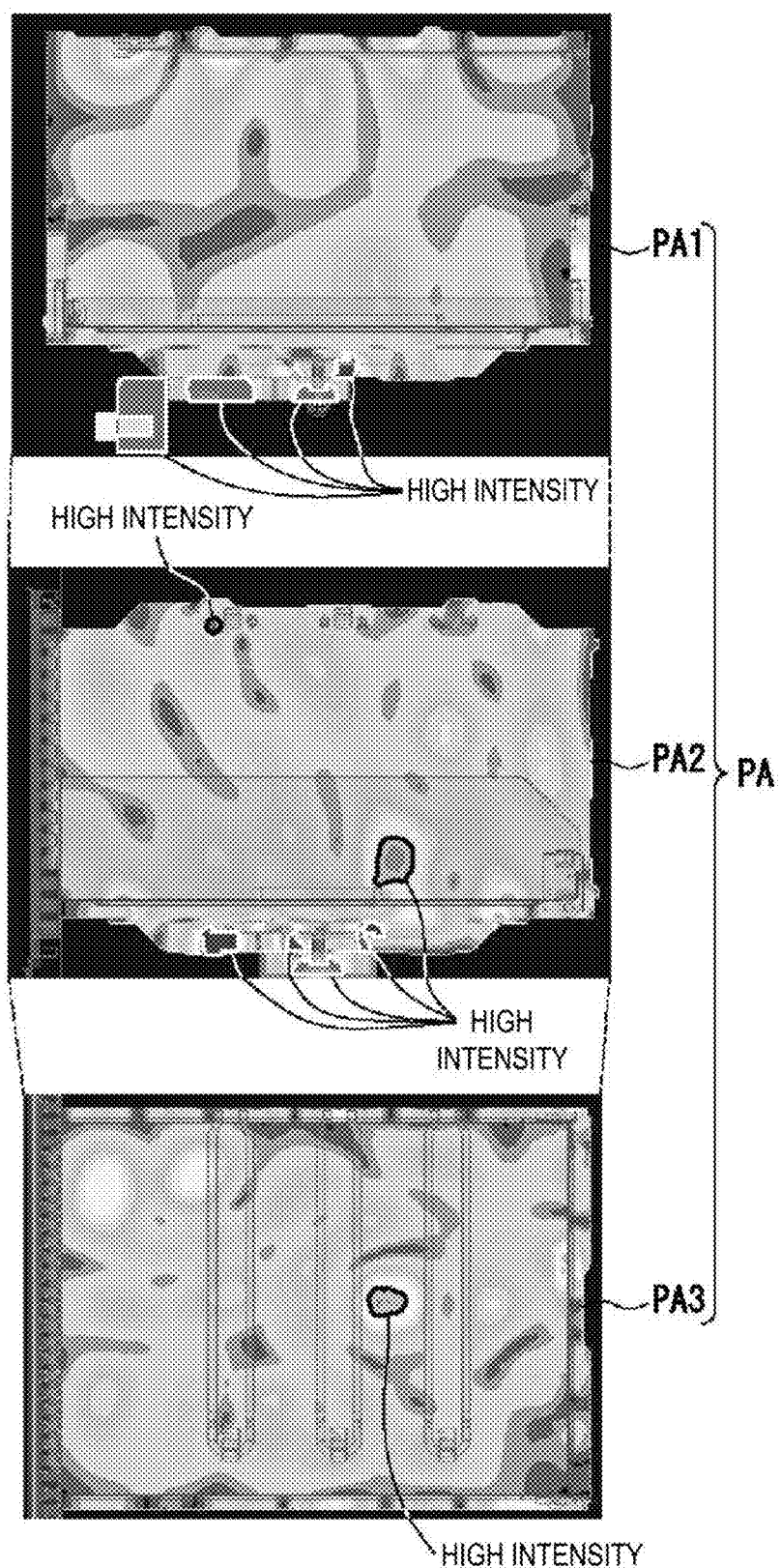
FIG. 10 is a diagram illustrating a simulation result of an intensity distribution of microwaves in a pull-out body according to Example 1.
Figure 11:
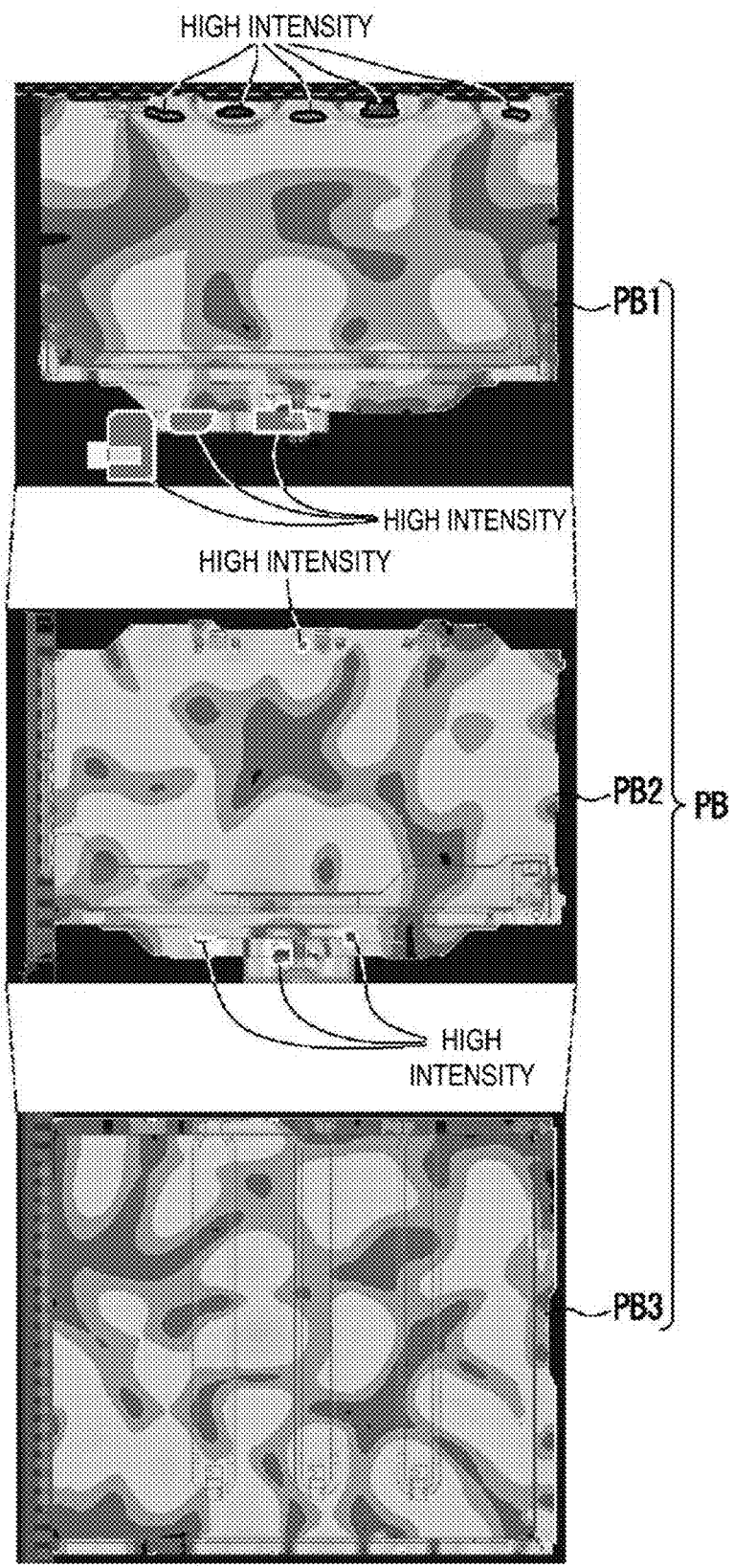
FIG. 11 is a diagram illustrating a simulation result of an intensity distribution of microwaves in a pull-out body according to Comparative Example 1.

The pull-out bodies 2 according to Example 1 and Comparative Example 1 were used to calculate an intensity distribution of the microwaves M by using simulation. In the simulation, software "High-frequency 3-dimensional field analysis software" (available from Ansys Japan, Inc.) was used. The evaluation results are illustrated in FIG. 10 and FIG. 11. FIG. 10 is a diagram illustrating a simulation result PA of the intensity distribution of the microwaves M in the pull-out body 2 according to Example 1. FIG. 11 is a diagram illustrating a simulation result PB of the intensity distribution of the microwaves M in the pull-out body 2 according to Comparative Example 1. In FIG. 10 and FIG. 11, a thick line is drawn around a high-intensity region irradiated with the microwaves M having a high intensity, and in regions other than the high-intensity region, a lighter color indicates that the intensity of the microwaves M is higher.

As illustrated in FIG. 10, the simulation result PA includes a first simulation result PA1, a second simulation result PA2, and a third simulation result PA3. As illustrated in FIG. 11, the simulation result PB includes a first simulation result PB1, a second simulation result PB2, and a third simulation result PB3. More specifically, the first simulation result PA1 and the first simulation result PB1 are simulation results in cutting in a plane orthogonal to the third direction D3. The second simulation result PA2 and the second simulation result PB2 are simulation results in cutting in a plane orthogonal to the second direction D2. The third simulation result PA3 and the third simulation result PB3 are simulation results in cutting in a plane orthogonal to the first direction D1.

In a case where the pull-out body 2 according to Comparative Example 1 is used, there are many regions where the intensity of the microwaves M is low, while in a case where the pull-out body 2 according to Example 1 is used, regions where the intensity of the microwaves M is high are increased. That is, in a case where the pull-out body 2 according to Comparative Example 1 was used, it was impossible to uniformly irradiate the placing space 120 with the microwaves M. In contrast, in a case where the pull-out body 2 according to Example 1 was used, it was possible to relatively uniformly and efficiently irradiate the placing space 120 with the microwaves M, and it was possible to intensively irradiate the vicinity of the center of the placing surface 22A with the microwaves M.

INDUSTRIAL APPLICABILITY

The present invention is useful in the field of a heating cooking apparatus, for example.

REFERENCE SIGNS LIST

1 Heating chamber
1A Right wall
1B Left wall
1C Top wall
1D Bottom wall
1E Back wall
2 Pull-out body
10 Side wall portion
13 Air sending unit
15 Microwave supply unit
20 Wall portion
21 Lid portion
22 Placing portion
23C Right side plate portion
23D Left side plate portion
100 Pull-out heating cooking apparatus

The invention claimed is:

1. A heating cooking apparatus, comprising:
a microwave supply unit positioned below a heating cooking chamber and configured to supply microwaves to the heating cooking chamber; and
a drawer portion configured to be pulled out with respect to the heating cooking chamber,
wherein the drawer portion includes
a placing portion made of non-metal and including a placing surface on which an object to be heated is placed, and
a wall portion made of metal and extending in a first direction intersecting the placing surface.

2. The heating cooking apparatus according to claim 1, wherein the wall portion reflects the microwaves toward the object to be heated.

3. The heating cooking apparatus according to claim 1, wherein the drawer portion includes a pair of the wall portions facing each other in a second direction,
the drawer portion is configured to be pulled out along a third direction with respect to the heating cooking chamber, and
the first direction, the second direction, and the third direction are orthogonal to one another.

4. The heating cooking apparatus according to claim 3, further comprising:
the heating cooking chamber,
wherein the heating cooking chamber includes
a pair of side wall portions facing each other in the second direction,
a rear face wall portion intersecting the third direction, and
an opening portion facing the rear face wall portion,
the drawer portion further includes a lid portion configured to close the opening portion, and
a distance between one side wall portion and the other side wall portion of the pair of side wall portions is greater than a distance between the lid portion that closes the opening portion and the rear face wall portion.

5. The heating cooking apparatus according to claim 4, further comprising:
an air sending unit configured to supply hot air from the rear face wall portion to the heating cooking chamber through an air sending hole.

6. The heating cooking apparatus according to claim 1, further comprising:
a functional member configured to change a state of an atmosphere in the heating cooking chamber,
wherein a position of an upper end of the wall portion is lower than a position of a lower end of the functional member.

7. The heating cooking apparatus according to claim 1, wherein the microwave supply unit includes
a radiation port through which the microwaves are supplied to the heating cooking chamber, and
a cover member made of non-metal and configured to cover the radiation port, and
the placing portion is positioned above the cover member in a state where the drawer portion is retracted.

* * * * *